United States Patent [19]

Tilse

[11] Patent Number: 4,871,227
[45] Date of Patent: Oct. 3, 1989

[54] OPTICAL FIBER CONNECTOR

[75] Inventor: Wilhelm Tilse, Birkenfeld, Fed. Rep. of Germany

[73] Assignee: Inovan GmbH & Co. KG. Metalle und Bauelemente, Birkenfeld, Fed. Rep. of Germany

[21] Appl. No.: 168,247

[22] Filed: Mar. 15, 1988

[30] Foreign Application Priority Data

Apr. 4, 1987 [DE] Fed. Rep. of Germany ....... 3711457

[51] Int. Cl.$^4$ .............................................. G02B 6/38
[52] U.S. Cl. .................................................. 350/96.21
[58] Field of Search .................. 350/96.2, 96.21, 96.22

[56] References Cited

FOREIGN PATENT DOCUMENTS 57-34512   2/1982  Japan ................................... 350/96.2
57-139716  8/1982  Japan ................................... 350/96.2
60-194412 10/1985  Japan ................................... 350/96.2

Primary Examiner—John D. Lee
Assistant Examiner—John Ngo

[57] ABSTRACT

In an optical fiber connector for joining the ends of pairs of light conducting fibers which includes a mounting plate provided with guide grooves receiving the fiber ends and a pressure plate structure disposed on top of the mounting plate and hinged and latched thereto, guide grooves are formed only in the mounting plate and have a depth greater than the fiber radius and the pressure plate structure has elastic clamping members formed therefrom so as to project toward the mounting plate for resilient engagement with the respective optical fiber ends and the clamping members engaging the ends of each pair of fibers are spaced such that an open area is provided at the fiber joints to provide for visibility of and access to the joints, the mounting plate and pressure plate structure having at their ends clamping structures for engaging and axially fixing the position of the fibers where the connector is closed.

7 Claims, 2 Drawing Sheets

OPTICAL FIBER CONNECTOR

BACKGROUND OF THE INVENTION

The invention relates to an optical fiber connector for joining the ends of two light wave guides or optical fibers or of a plurality of pairs of such optical fibers in such a manner that the end faces of the fiber which are securely positioned in abutment with, or in a predetermined distance from, one another and the fibers of each pair are in axial alignment, the connector consisting of plates interconnected by flexible hinge portions and locking structures disposed on the sides opposite the hinge portions and having fiber receiving guide grooves formed in the plates.

Such optical fiber connectors are needed for the joining of light conducting fibers disposed in light signal transmitting fibers. Since for practical reasons such fibers cannot be manufactured in unlimited lengths and quite frequently consist of relatively short lengths, optical fiber connectors must be utilized in relatively large numbers. The joining of optical fibers by such connectors should therefore be simple so that no especially skilled workers are required for the installation of optical fiber cables and it should further be possible to manufacture the connectors economically.

In spite of the requirement for simple assembly of the fibers and connectors the fibers to be joined must be positioned by the connectors in such a manner that little, if any, light signal losses occur. This requires at least that the fiber ends remain in axial alignment. For checking the distance between the faces of each pair of fibers the fiber joints should also be observable. It should also be possible to cast the joint into a synthetic resin for stabilization of the fiber joint.

A prior art connector of this type as disclosed in DE-PS-No. 2557660 consists of two hinged plates provided with guide grooves for the reception of the optical fibers. For joining, the fiber ends to be connected are placed into the grooves in the plates and cut to such a length that the end faces of the fibers are disposed adjacent one another when the plates are folded up. In spite of the simple design of this connector the proper mounting of the fiber ends is quite difficult since the cable ends are fixed in their positions only when the two plates are folded up and locked together. It may also be pointed out that firm mounting of the fiber ends in the grooves of the plates is not insured since the rigid walls of the grooves cannot adapt to the diameter tolerances of the light conducting fibers. Furthermore, a checking of the position of the fiber ends within the connector is not possible once the connector is closed.

SUMMARY OF THE INVENTION

An optical fiber connector for joining the ends of pairs of light conducting fibers includes a mounting plate provided with guide grooves receiving the fiber ends so as to be in axial alignment and a pressure plate structure which is hinged to the mounting plate so as to overlay the fiber ends disposed in the guide grooves and which is provided with latches for engagement with the mounting plate. The guide grooves in the mounting plate are of a depth greater than the radius of the fibers and the pressure plate structure has elastic clamping members formed therefrom for resilient engagement with the fiber ends, which clamping members are spaced along the fiber ends so as to provide an open area at the fiber joints to provide for accessibility and visibility of the joints. The mounting plate and pressure plate structure have at their longitudinal ends clamping structures which engage and axially fix the fibers when the connector is closed.

In this arrangement the light conducting fiber ends are not simply placed into essentially semicircular grooves in one of the connector halves where they are more or less appropriately held in position as it is the case in the prior art arrangements, but the light conducting fiber ends are placed into relatively deep guide grooves in one of the connector plates and are held in position by resilient clamping members associated with the opposite connector plate. Placing the fiber ends into the guide grooves is simple and their position can be observed while the opposite connector plate is folded onto the fiber ends which are engaged by the clamping members and fixed in their positions. Folding up of the connector plates is also simple since the plates are hinged together by a flexible strip which insures that the resilient clamping members appropriately engage the light fiber ends. No skilled workers are needed for this simple and efficient joining procedure.

The whole connector may consist of an elastic material—it may be punched from metal strips or it may be injection molded from a plastic material. Material and manufacturing costs are therefore very low.

Altogether the light conducting fiber connector according to the invention is therefore easy to assemble and inexpensive to manufacture.

Assembly of the connector is facilitated partly by the fact that the connector includes fiber engagement structures which, upon fold-up of the connector plates, firmly engage the coatings of the fibers to be joined. The engagement structures may include projections which penetrate the fiber coatings when the fibers are pressed into the connector plates so that the fiber ends are firmly positioned during the assembly procedure.

It has been found to be advantageous to make the fiber joints within the fiber connector in a floating manner. This is achieved by forming the guide groove in a tongue which is formed out of the connector plate and also forming the clamping members from the opposite connector plate in such a manner that they extend alongside and project cantilever-spring like over the fiber ends and resiliently engage the fiber ends upon fold up of the connector plates.

It order to obtain clearly defined positions for the light conducting fibers to be joined, the guide grooves are formed in accordance with the invention in such a manner that their cross-section is parabola-shaped and the half parameter of such parabola is equal or slightly smaller than the radius of the fiber ends to be joined. If the half parameter equals the radius of the respective fiber, the fiber surface has the same curvature as the bottom of the groove and is snugly contained therein. If the half parameter of the parabola is smaller than the radius of the fiber, the fiber ends are supported tangentially along axial lines on the side walls of the guide groove, which also provides for a clearly defined position of the light conducting fibers.

This provides not only for firm engagement of the light conducting fibers in the guide groove but also for axial alignment of the fiber ends to be joined and engaged by the clamping members. The clamping members are spaced to provide a center gap through which the fiber ends are visible and through which a joining material may be cast around the fiber ends.

SHORT DESCRIPTION OF THE DRAWINGS

DESCRIPTION OF THE PREFERRED EMBODIMENTS

Figure 4:
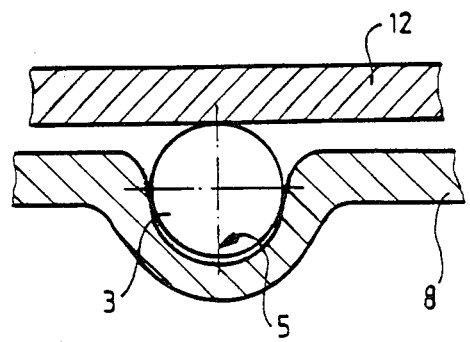
FIG. 4 is a partial cross-sectional view of the guide groove area of the connector.

In the arrangement as shown in FIGS. 1 to 4 two light conducting glass fibers 1, 2 are joined or "spliced". In order to make an appropriate connection it is important to make sure that the two fiber ends are held in axial alignment without the slightest angle between the end axes. It is also necessary that the end faces of the fibers abut one another or are arranged at a predetermined distance from one another. In order to prevent radial or angular displacement of the fiber ends 3, 4, the glass fibers 1, 2 are disposed in guide grooves 5 of parabolic cross-section and the light conducting fibers which are coated are pressed into clamping structures 7 which have projections 6 that penetrate the surface of the fiber coating. In this manner a firm preliminary mounting of the fiber ends is achieved. Care must only be taken that the fiber end faces are in abutment or disposed at a predetermined distance from one another. Once the proper positions of the fiber ends have been established, the connector plates, that is, the mounting plate 8 and the pressure plate 9 which are joined by a resilient hinge structure 10, may be folded up and locked together in closed position by a latch 11. In the locked position of the connector, elastic clamping members 12 resiliently engage the fiber ends 3, 4 with a clamping force which is predetermined by the selection of the material strength of the clamping members 12 and force the glass fiber ends 3, 4 into the guide groove 5 as shown in FIG. 4. Accurate position of the fiber ends can be checked through the opening 13 after assemblage of the connector with the fibers. It is also possible to fill a plastic into the connector to provide a casting which insures the position of the glass fiber end relative to one another and additionally provides for protection from contaminants.

Figure 1:
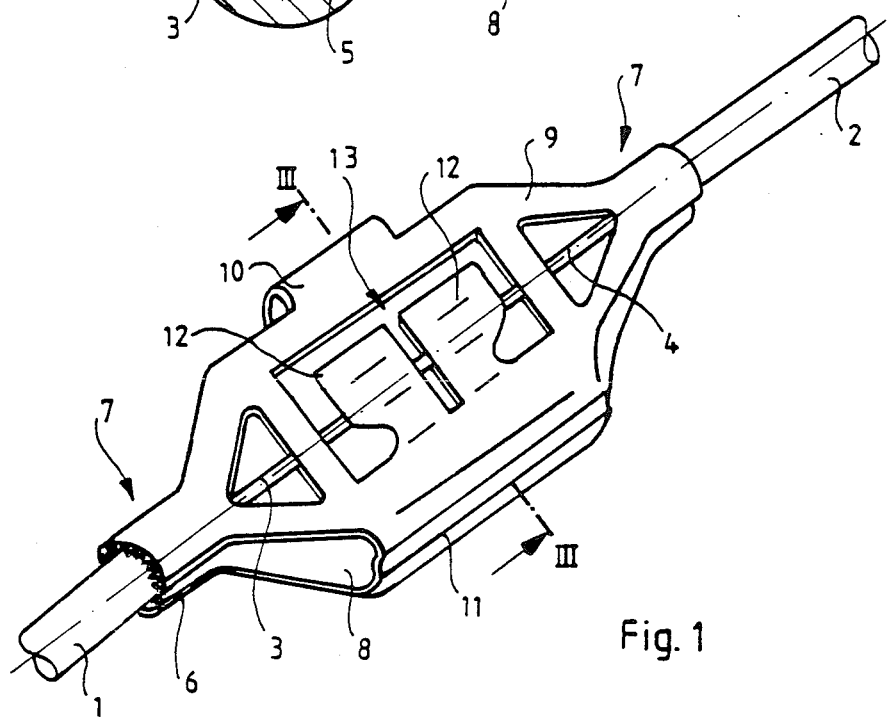
FIG. 1 is a perspective view of a connector joining the ends of two light conducting fibers.
Figure 5:
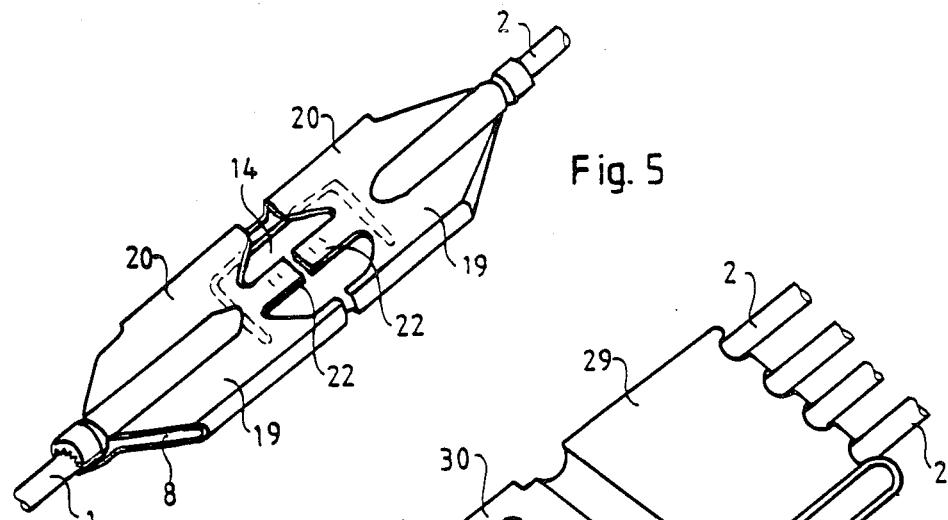
FIG. 5 shows another embodiment of a connector.

FIG. 5 shows a connector which, in principle, is the same as the one shown in FIG. 1 except that the pressure plate consists of two partial pressure plates 19 which are independently hinged to the support plate in alignment with the light conducting fibers 1, 2, each having a latch 20 associated therewith for connection to the mounting plate 8.

Figure 2:
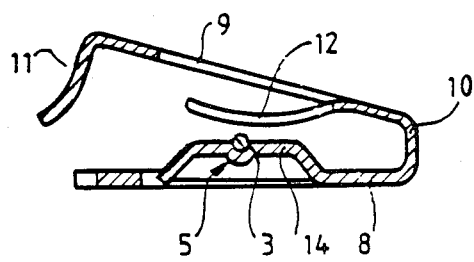
FIG. 2 shows the connector in open position.
Figure 3:
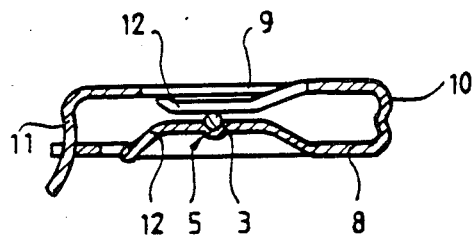
FIG. 3 shows the connector in closed position.

In this case, the clamping members 22 extend lengthwise with respect to the glass fibers and resiliently engage the fiber ends forcing them into the guide groove 5 in the mounting plate 8 again as shown in FIG. 4. The guide groove 5 is disposed in a tongue 14 formed out of the base plate 8 as shown in FIGS. 2 and 3.

Figure 6:
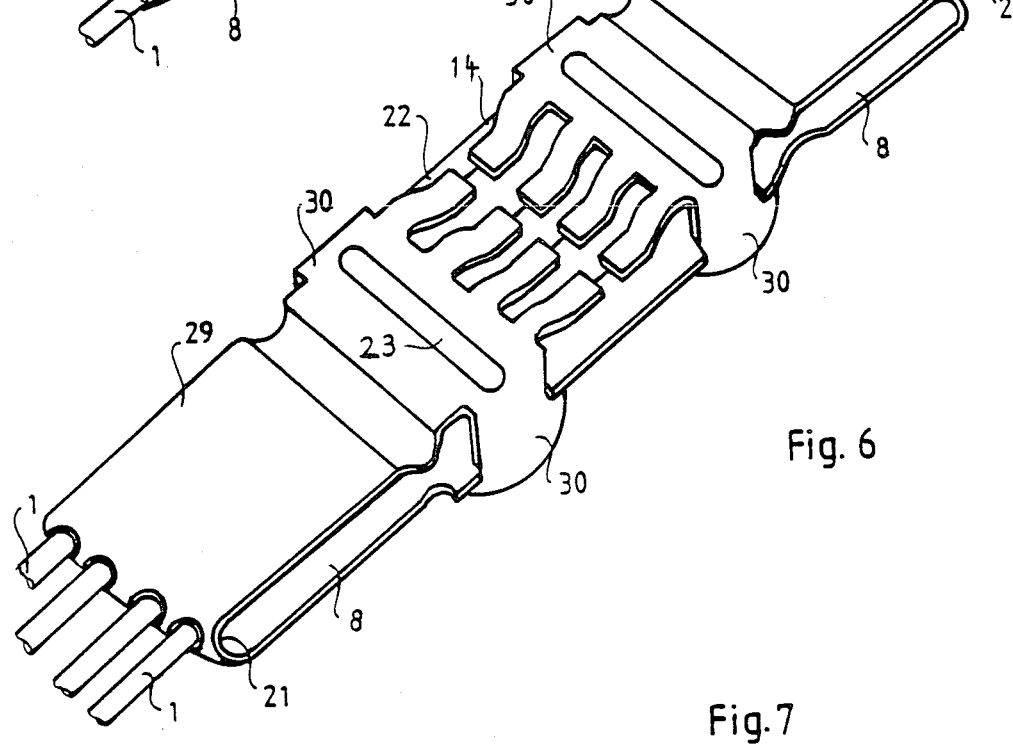
FIG. 6 is a perspective view of a multiple fiber connector.

FIG. 6 finally shows a multiple optical fiber connector by which, for example, four incoming optical fibers 1 are connected to four outgoing optical fibers 2. This arrangement also utilizes lengthwise extending clamping members 22 projecting from two partial pressure plates 29 which press the optical fibers into the respective guide grooves 5. It is noted that in the arrangement shown in FIG. 6 the clamping members 22, because of their detent shape, apply an axial force to the fiber ends which tends to bring the end faces of the fibers into firm abutment upon closing of the connector.

The partial pressure plates 29 have at their longitudinal ends opposite the clamping members 22 hinge portions 21 by which they are hinged to the mounting plate 8, the hinge portions 21 having openings receiving the light conducting fibers 1 and 2. At their free ends adjacent the clamping members 22, the pressure plate portions 29 are provided with latches 30 adapted to engage the fiber mounting plate 8.

Figure 7:
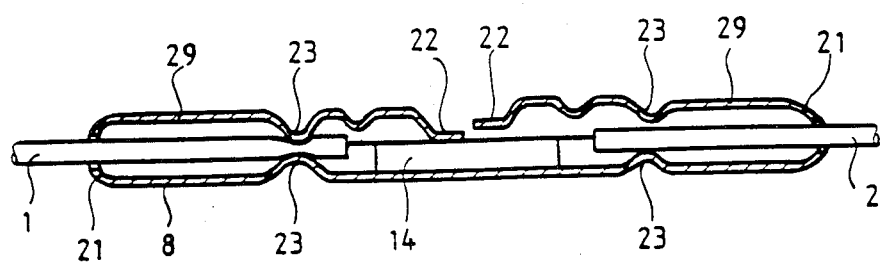
FIG. 7 is a side view of the connector of FIG. 6.

FIG. 7 is a sectional view taken along one pair of light conducting fibers of the multiple fiber connector of FIG. 6 in such a manner that the location of the hinge portions 21 is clearly shown. This view also shows the stiffening corrugations 23 formed in the pressure plate portions 29 by which the fibers 1, 2 are also engaged and properly positioned when the connector is closed.

What is claimed:

1. An optical fiber connector for joining the ends of at least one pair of light conducting fibers in such a manner that the fibers of each pair are arranged in axial alignment and the end faces of each pair of fibers are disposed in abutment with, or at a predetermined distance from, one another, said connector comprising a mounting plate having for each pair of fibers a guide groove formed therein for the reception of said fiber ends, a pressure plate structure disposed on top of said mounting plate and having a resilient hinge strap at one side and a latch at the opposite side for connection to said mounting plate, the guide grooves for each pair of fibers being formed only in said mounting plate and having a depth greater than the radius of said fibers and each guide groove further having a parabolic cross-section with the parabola half parameter being equal to or slightly smaller than the radius of the optical fibers to be joined, said pressure plate structure having formed therefrom for each fiber end an elastic clamping member projecting toward said mounting plate so as to resiliently engage the fiber end in the respective guide groove when said pressure plate structure is latched onto said mounting plate with the clamping members for each joint being longitudinally spaced from one another at the fiber joint so as to provide for visibility of and access to the fiber joints, said mounting and pressure plates further having a cooperating clamping structure for firmly engaging said light conducting fibers.

2. A fiber connector according to claim 1, wherein said guide grooves are disposed in a tongue formed out of said mounting plate.

3. A fiber connector according to claim 1, wherein said clamping members are resilient tongue members formed from said pressure plate so as to extend transversely over the respective fiber ends.

4. The fiber connector according to claim 1, wherein said clamping members are resilient tongue members formed from said pressure plate so as to extend longitudinally over the respective fiber ends.

5. A fiber connector according to claim 1 wherein said clamping structures at the longitudinal ends of said mounting and pressure plates are provided with projections firmly engaging the coating which is disposed around the fibers to be joined.

6. A fiber connector according to claim 1, wherein said pressure plate structure carrying said clamping members consists of two partial plates separated transversely along the optical fiber joints, said partial plates having hinge structures and latches for connection to the mounting plate.

7. A fiber connector according to claim 1, wherein said mounting plate and pressure plates consist of an elastic material comprising metal and plastic.

* * * * *